Patented Feb. 14, 1939

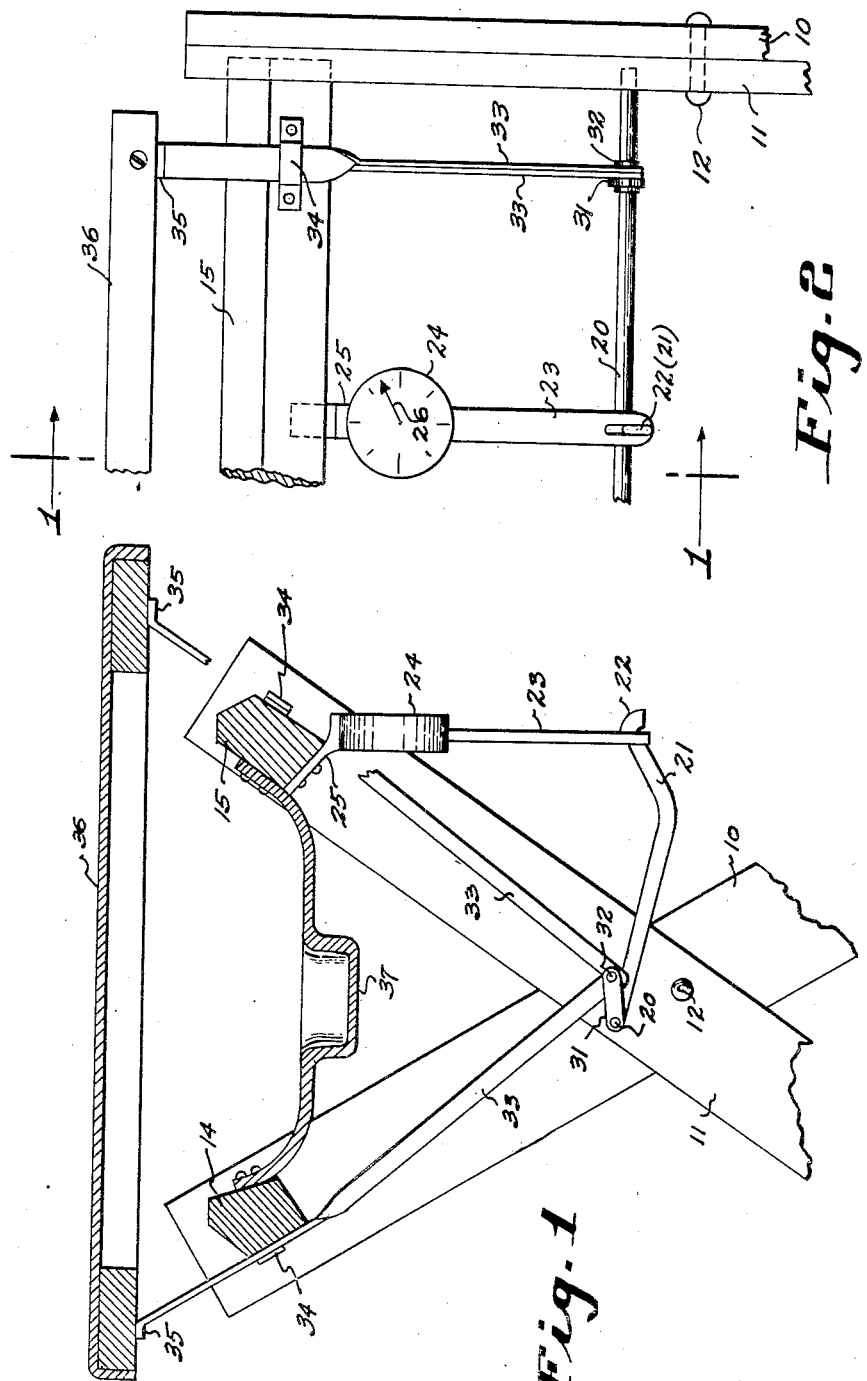

2,147,201

UNITED STATES PATENT OFFICE 2,147,201

FOLDING WEIGHING DEVICE

Benjamin B. Klayman, Detroit, Mich.

Application October 15, 1937, Serial No. 169,250

3 Claims. (Cl. 265—27)

This application relates to folding weighing devices, as disclosed in the appended drawing in which—

Fig. 1 is an end section, as if on line 1—1, Fig. 2; and,

Fig. 2 is a cut away or partial front elevation.

Referring to the drawing, it will be seen that the device comprises a foldable X type support having pairs of end pieces 10 and 11, pivotally connected at 12. Connecting the end pieces 10—11 at their upper ends are braces 14—15. Suitable braces connect the lower ends of the end pieces, and others form cross connections, whereby a rigid and sturdy foldable X type support may be provided.

Connecting the end pieces 11 adjacent their pivotal connections 12 to the end pieces 10 is a rod or crank shaft 20 and fixed to this rod at a point midway between its ends is a crank arm 21 whose free end is in the form of a hook 22 which may be detachably interlocked to a stirrup-formed lower end of an operating link 23 connected to a registering mechanism within a spring scale 24 which is fixed to and depends from the brace 15, being supported therefrom by means of a strap 25.

Fixed to the rod 20 at opposite ends thereof are two crank arms 31 whose free ends are pivotally connected at 32 to the lower ends of straps 33, slidably guided in guides 34 secured to the braces 14—15 and having their upper ends turned, as indicated, to provide feet 35 upon which may be removably disposed a platform 36, the latter being so proportioned with respect to the feet 35 of the straps 33 and also with respect to the braces 14—15 that it may be removed from the feet 35 of the straps 33 and disposed loosely on the braces 14—15, or removed from these braces and disposed loosely on the feet 35, optionally as desired, or removed from the feet and braces altogether.

When the platform is disposed on the feet 35 of the straps 33 and a weight is placed on the platform, the weight will cause the feet 33 to slide downwardly in the guides 34, rotating the crank arm 31 clockwise, Fig. 1, and consequently rotating the rod 20 and the crank arm 21 also clockwise and thus causing a downward pull on the link 23, with the force of such downward pull, responsive to the weight on the platform 36, being registered by the needle 26 of the scale.

When the device is to be folded for storage purposes or otherwise, the platform 36 will be removed from off the feet 35 and the detachable connection at 22 between the link 23 and the arm 21 is broken. The X support may then be collapsed or folded.

If desired, the space between braces 14—15 may be bridged by a collapsible vessel or tub or container 37 whose upper edges are fastened to the braces and which is thus supported by the scale support.

It will be observed that the platform, when in place on the braces or on the feet, will form a cover for the vessel; and when removed from either the braces or the feet, will uncover the vessel.

Now having described the platform scale hereof, reference will be had to the claims which follow for a determination of the inventions embodied therein.

I claim:

1. A weighing scale including a platform, a foldable X type support having foldable interconnected X type ends, a spring scale disposed on and mounted by said support and linkage, means carried by said support and releasably connected to the scale and having parts for engaging and supporting the platform, the arrangement being such that when the releasable connection between the linkage means and the scale is established, the said parts lift the platform above and off the support and thus support the platform for weighing, and when the releasable connection between the linkage means and the scale is destroyed, the said parts drop and permit the platform to rest on the support and be free of the scale, thus relieving the scale of loads on the platform when the scale and platform are disconnected, the linkage means operating as an operative connection between the platform and the scale when the releasable connection of the linkage means to the scale is established, the platform being so connected to the support as to be movable out of the position above the support to permit the support to fold, when the releasable connection between the linkage means and the scale is destroyed.

2. A construction of the character described in claim 1 wherein the interconnection between the X type ends comprises braces at the upper part of the support upon which the platform rests when it is not supported by the linkage means.

3. A construction of the character described in claim 1 wherein the interconnection between the X type ends comprises braces at the upper part of the support upon which the platform rests when it is not supported by the linkage means, the braces being adapted to support a vessel having an open top adapted to be covered by the platform when the latter is positioned above the braces and exposed when the platform is not positioned above the braces.

BENJAMIN B. KLAYMAN.